United States Patent
Song et al.

(10) Patent No.: US 8,842,510 B2
(45) Date of Patent: Sep. 23, 2014

(54) OPTICAL DISC DRIVE AND METHOD OF DRIVING THE SAME

(71) Applicant: Toshiba Samsung Storage Technology Korea Corporation, Suwon-si (KR)

(72) Inventors: Byung-youn Song, Suwon-si (KR); Nag-eui Choi, Suwon-si (KR); Seung-ki Kim, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/650,379

(22) Filed: Oct. 12, 2012

(65) Prior Publication Data

US 2013/0094335 A1    Apr. 18, 2013

(30) Foreign Application Priority Data

Oct. 14, 2011    (KR) .................. 10-2011-0105223

(51) Int. Cl.
*G11B 11/00* (2006.01)

(52) U.S. Cl.
USPC .................. 369/53.37; 369/124.01

(58) Field of Classification Search
None
See application file for complete search history.

(56) References Cited

U.S. PATENT DOCUMENTS

| | | | |
|---|---|---|---|
| 6,374,040 B2 * | 4/2002 | Mizoguchi et al. | 386/344 |
| 6,452,952 B1 * | 9/2002 | Okuhara | 370/536 |
| 2007/0255864 A1 * | 11/2007 | Moriwaki | 710/22 |
| 2011/0019523 A1 * | 1/2011 | Chang et al. | 369/84 |
| 2012/0008472 A1 * | 1/2012 | Hanes | 369/44.27 |

* cited by examiner

*Primary Examiner* — Paul Huber
(74) *Attorney, Agent, or Firm* — NSIP Law

(57) ABSTRACT

Provided is a multi-functional optical disc drive that includes an interface that connects a front-end of the optical drive to a back-end, and also connects the front-end of the optical drive to an external device. The optical drive also includes a controller that selectively controls connection to the back-end or the external device.

18 Claims, 5 Drawing Sheets

OPTICAL DISC DRIVE AND METHOD OF DRIVING THE SAME

CROSS-REFERENCE TO RELATED APPLICATION(S)

This application claims the benefit under 35 USC §119(a) of Korean Patent Application No. 10-2011-0105223, filed on Oct. 14, 2011, in the Korean Intellectual Property Office, the entire disclosure of which is incorporated herein by reference for all purposes.

BACKGROUND

1. Field

The following description relates to an optical disc drive and a method of driving the optical disc drive, and more particularly, to a multi-functional optical disc drive.

2. Description of Related Art

Optical disc drives (ODDs) read data from optical discs, such as compact discs (CDs), digital versatile discs (DVDs), Blu-ray discs (BDs), and the like, to reproduce and/or write the data. ODDs are generally connected to or included in devices such as desktop personal computers (PCs), notebook PCs, and the like. ODDs are also used in various audio/video (AV) devices, such as DVD players, Blu-ray players, game consoles, and the like.

Typically, an ODD uses the same configuration to reproduced or write data by extracting data written in optical discs which is the same regardless of the type of device in which the ODD is installed. However, because a configuration of the ODD for processing signals extracted from an optical disc drive or processing signals for writing data varies according to a device, an individual optical disc drive is provided for each respective device. Thus, even though the same configuration of an optical disc drive is used in desktop PCs, notebook PCs, and various AV devices regardless of a type of device to be used, an individual optical disc drive is provided for each device.

SUMMARY

In an aspect, there is provided an optical disc drive including an optical drive module for writing and/or reproducing information to and/or from an optical disc and comprising a front-end portion that processes data from the optical disc, a back-end module comprising an audio part and a video part that decodes and outputs audio signals and video signals from signals generated by the optical drive module or encodes input audio signals and video signals, and an interface comprising a first port that connects the optical drive module and the back-end module, a second port that connects the optical drive module to an external device, and a controller that selectively controls connection to the first port or the second port.

The interface device may support universal serial bus (USB) or serial advanced technology attachment (SATA).

The controller may comprise first and second switches corresponding to the first and second ports, and first and second gate controllers for operating the first and second switches, respectively, by detecting a current of a data line connected to each of the first and second ports.

In response to a current that is equal to or greater than a predetermined value being detected from a data line to which the external device is connected, the controller may cut off the first port to which the back-end module is connected using the first switch and allow digital data to be transmitted between the optical disc drive module and the external device via the second port, and in response to the current that is equal to or greater than the predetermined value not being detected from the data line to which the external device is connected, and in response to a current that is equal to or greater than the predetermined value being detected from a data line to which the back-end module is connected, the controller may cut off the second port using the second switch and allow the audio signals and the video signals to be transmitted between the back-end module and the optical disc drive module via the first port.

The back-end module may further comprise at least one of HDMI, DVI, and D-SUB output units.

The back-end module may further comprise an analog audio output unit.

The back-end module may further comprise a wireless communication unit.

In an aspect, there is provided a method of driving an optical disc drive comprising an optical drive module for writing and/or reproducing information to and/or from an optical disc and for processing data from the optical disc, a back-end module that decodes and outputs audio signals and video signals from signals generated by the optical drive module or encodes input audio signals and video signals, and an interface that connects the optical drive module and the back-end module, that connects the optical drive module to an external device, and that selectively controls connection to the first port or the second port, the method including obtaining digital data from the optical disc or writing information to the optical disc using the optical drive module, obtaining audio signals and video signals by processing the digital data or obtaining digital data by processing input audio signals and video signals using a back-end module, and selectively outputting digital data from the optical disc drive module to the back-end module and to the external device using the interface.

The interface may support universal serial bus (USB) or serial advanced technology attachment (SATA).

If a current is detected from the back-end module via the first port, the second port and the external device may be electrically separated from each other, and if a current is detected from the external device via the second port, the first port and the back-end module may be electrically separated from each other.

The back-end module may output digital video signals.

The interface may support USB or SATA.

In an aspect, there is provided a multi-functional optical disc drive, including an optical disc drive module configured to obtain digital data from a disc, a back-end configured to decode and output audio signals and video signals from signals generated by the optical disc drive module, and an interface configured to selectively connect the optical disc drive module with the back-end and to connect the optical disc drive module with an external device, such that the optical disc drive module is not connected to both the back-end and the external device at the same time.

The interface may comprise a first port to connect the optical disc drive module with the back-end, a second port to connect the optical disc drive module with the external device, and a controller to control the first port and the second port.

The optical disc drive module may comprise an optical pickup for writing/reproducing data from a disc, a motor for loading the disc onto the optical pickup, and a front-end that generates digital data that may be used for reproducing/writing audio/video (AV) signals.

The back-end may comprise an input/output unit which outputs/receives signals with various formats.

The various formats may comprise at least one of a high-definition multimedia interface that may output the digital signals generated by the back-end, a digital video interface (DVI), an analog D-SUB(VGA) interface, and an analog-audio input/output unit.

Other features and aspects may be apparent from the following detailed description, the drawings, and the claims.

Figure 1:
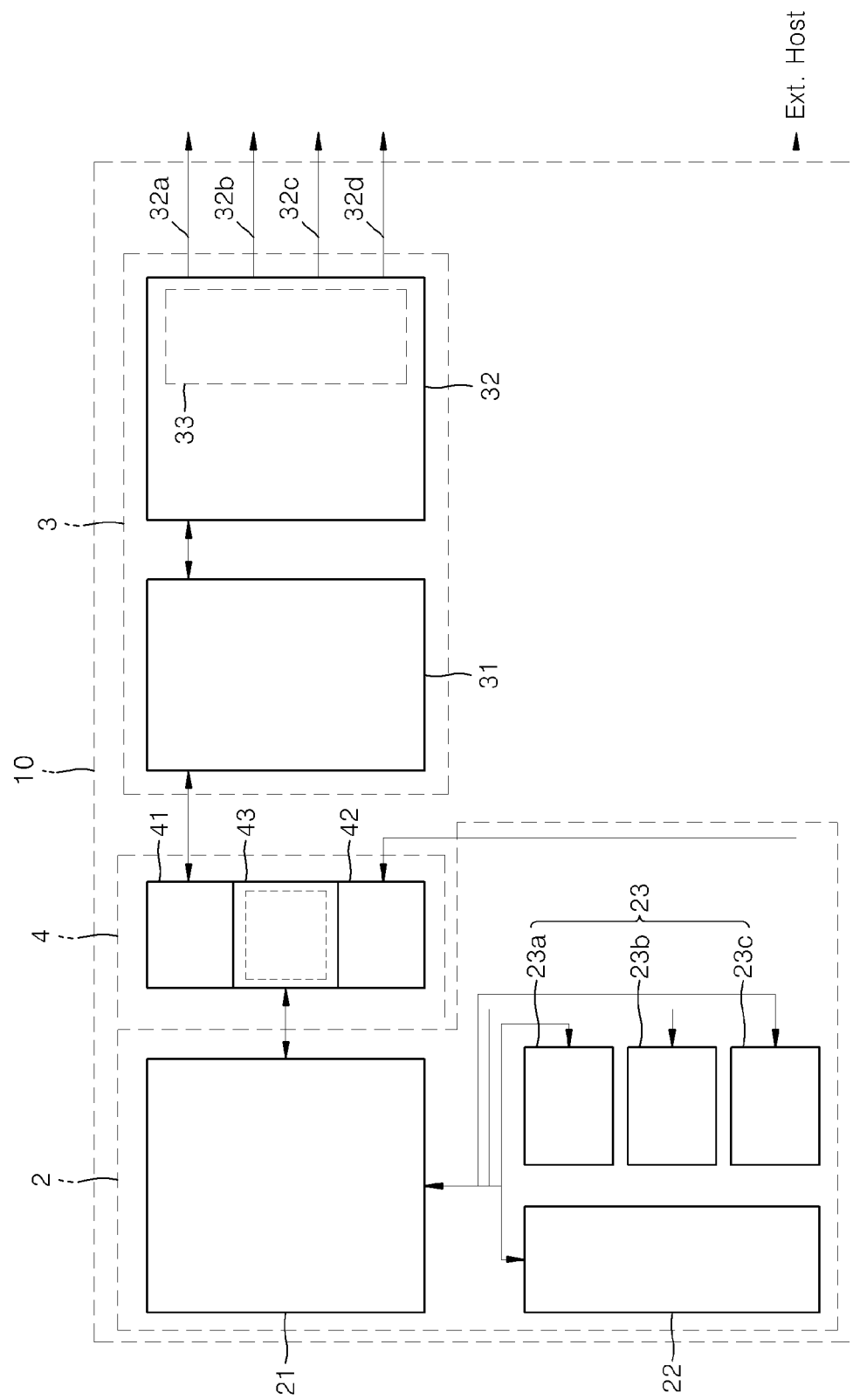
FIG. 1 is a diagram illustrating an example of an optical disc drive.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of an optical disc drive.

Referring to FIG. 1, in optical disc drive 10 includes an optical drive module 2 which includes a front-end portion 21, an optical pickup 22, and a motor portion 23. The motor portion 23 includes a loading motor 23a, a transfer motor 23b, and a spindle motor 23c. An interface 4 is disposed between the front-end portion 21 and a back-end portion 31 so as to selectively connect the front-end portion 21 to the back-end portion 31 or to an external host device. The interface 4 may include various interface circuits, for example, a circuit based on the universal serial bus (USB) standard, the serial advanced technology attachment (SATA) standard, and the like. The interface 4 also includes a first port 41 connected to the back-end portion 31, a second port 42 to which the external host device is connected, and a controller 43 that controls connection between the front-end portion 21 and the first and second ports 41 and 42. For example, the controller 43 may connect the optical drive module 2 of the front-end portion 21 to the back-end portion 31 using port 41. As another example, the controller 43 may connect the optical drive module 2 to the external host using port 42.

The front-end portion 21 may generate digital data that may be used for reproducing audio/video (AV) signals from signals obtained from the optical pickup 22, and generate optical output signals that may be used for writing information to an optical disc. The front-end portion 21 is connected to the optical pickup 22 and the motor portion 23. The loading motor 23a of the motor portion 23 may load the optical disc into the optical disc drive, and the transfer motor 23b may transfer the optical pickup 22 along a writing surface of the optical disc. The spindle motor 23c may rotate a spindle (not shown) on which the optical disc is mounted.

A back-end module 3 includes the back-end portion 31 and an input/output unit 32. The back-end portion 31 may process audio signals and video signals generated by the front-end portion 21 to be individually decoded into digital data with a format, for example, a moving picture experts group (MPEG) format, by using a decoder. The back-end portion 31 may convert the digital data into analog data using a digital to analog converter (DAC), and the like, and output the analog data to an external device via the input/output unit 32. In some examples, the back-end module 3 may further include an encoder (not shown) that encodes AV signals input via the input/output unit 32 so as to transmit the encoded AV signals to the front-end portion 21 and thus write the AV signals to the optical disc.

The input/output unit 32 may include one or more input/outputs in which output signals with various formats may be interfaced. For example, the input/output unit 32 may include a high-definition multimedia interface 32a that may output the digital signals generated by the back-end portion 31, a digital video interface (DVI) 32b, analog D-SUB(VGA) interface 32c, and an analog-audio input/output unit 32d. In some examples, the input/output unit 32 may further include a slave USB port (not shown) that may connect to an external slave device, such as a hard disc drive (HDD) or a secure digital (SD) memory. The input/output unit 32 may further include a wireless communication unit 33 that may transmit or receive signals via wireless communication, such as wireless fidelity (WiFi) or Bluetooth. The input/output unit 32 may also include a wired communication.

Figure 2:
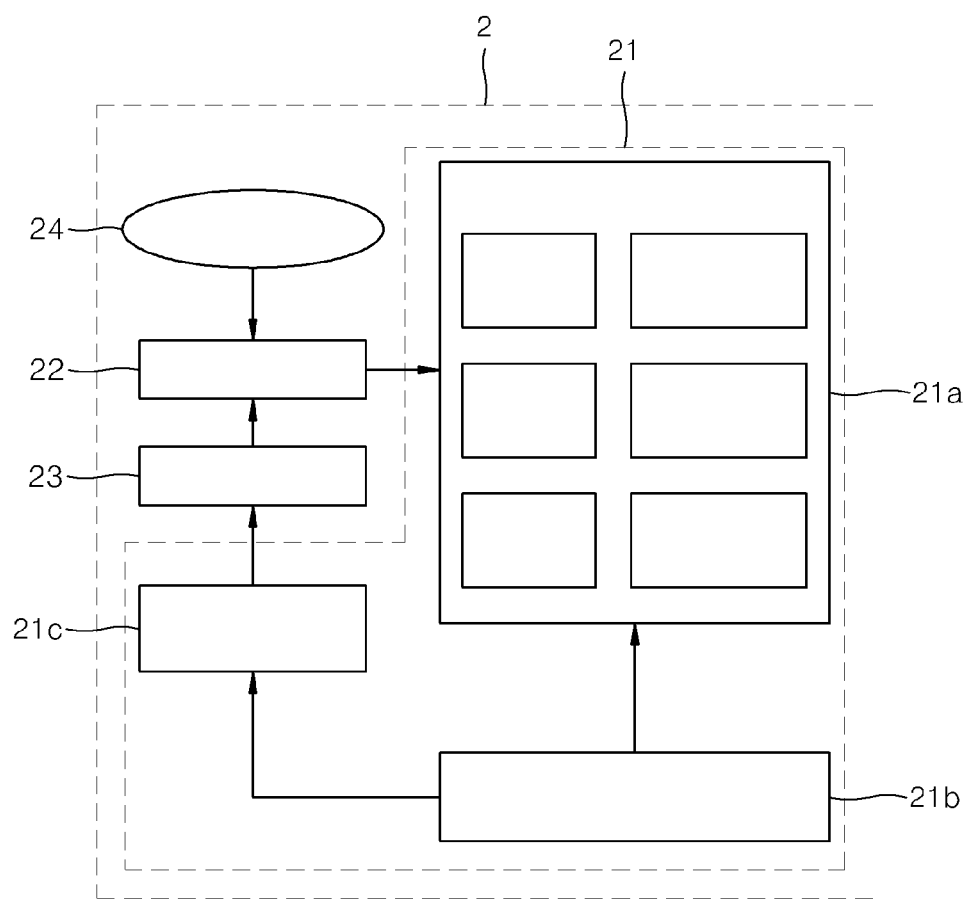
FIG. 2 is a diagram illustrating an example of an optical drive module of the optical disc drive illustrated in FIG. 1.

FIG. 2 illustrates an example of the front-end portion 21 of the optical disc drive illustrated in FIG. 1.

Referring to FIG. 2, the front-end portion 21 includes a digital signal processor (DSP) 21a, a system controller 21b, and a servo unit 21c. The DSP 21a may include a radio frequency (RF) signal processor that processes signals obtained from the optical pickup 22, a variable transmission rate controller that controls a transmission rate of the RF signal, a demodulator that demodulates data, an error correction unit that corrects an error of data, a descrambler that descrambles the error-corrected data, a data separator that separates data into audio and video signals, and the like.

In this example, the servo unit 21c is connected to the motor portion 23 including the loading motor 23a for loading the optical disc into the optical disc drive, the transfer motor 23b for transferring the optical pickup 22, and the spindle motor 23c for rotating the optical disc. The system controller 21b may control the overall operation of the optical drive module 2.

Figure 3:
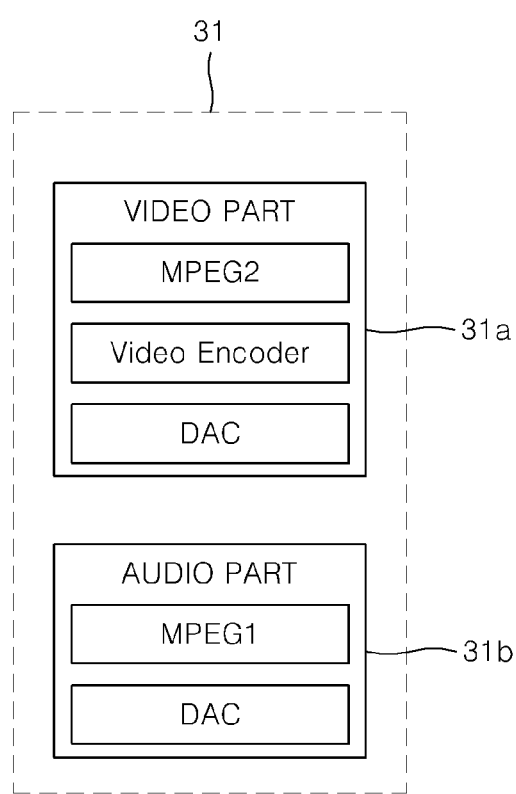
FIG. 3 is a diagram illustrating an example of a back-end portion of the optical disc drive of FIG. 1.

FIG. 3 illustrates an example of the back-end portion 31 of the back-end module 3 shown in FIG. 1.

Referring to FIG. 3, the back-end portion 31 includes a video part 31a and an audio part 31b. The back-end portion 31 may include a central processing unit (CPU) as well as a DSP. The back-end portion 31 may process the audio signals and the video signals generated by the front-end portion 21 using a decoder, convert the audio signals and the video signals using a DAC, or the like, and output the video signals and audio signals. The decoder is not limited to a particular format. For example, a decoder, such as a DTS decoder, a DOLBY decoder, an MPEG1 decoder, or the like, may be used for audio signals, and a decoder, such as an MPEG2, an MPEG4, a H.264, a VC1 decoder, or the like, may be used for video signals.

In addition, the back-end portion 31 may include an encoder that encodes the audio signals and the video signals input via the input/output unit 32 so as to transmit the encoded audio signals and the encoded video signals to the front-end portion 21. For example, the back-end portion 31 may include an encoder that encodes audio signals, such as a DTS decoder, a DOLBY decoder, an MPEG1 decoder, or the like, and an encoder that encodes video signals, such as an MPEG2, an MPEG4, a H.264, a VC1 encoder, or the like.

The input/output unit 32 may output the video signals and the audio signals from the back-end portion 31 to an external device, and may receive video signals and audio signals from the external device so as to transmit the video signals and the audio signals to the back-end portion 31. In order to respond to various external devices, the input/output unit 32 may perform digital output using a digital output interface, such as HDMI, DVI, or the like, or analog output using an analog output interface, such as a D-SUB. In the case of the audio signals, an analog or digital output may be performed. In addition, the analog signals and the digital signals may be transmitted via wireless communication, as described above.

In the optical disc drive, the front-end portion 21 of the optical drive module 2 may be connected to the back-end module 3 or the external device via the first port 41 and the second port 42, as described above. According to various aspects, when the front-end part 21 is simultaneously connected to the back-end module 3 that operates as a host, and the external device, the front-end portion 21 may malfunction. Thus, the controller 43 may control the optical drive module 2 to connect to one of the first port 41 and the second port 42.

Figure 4:
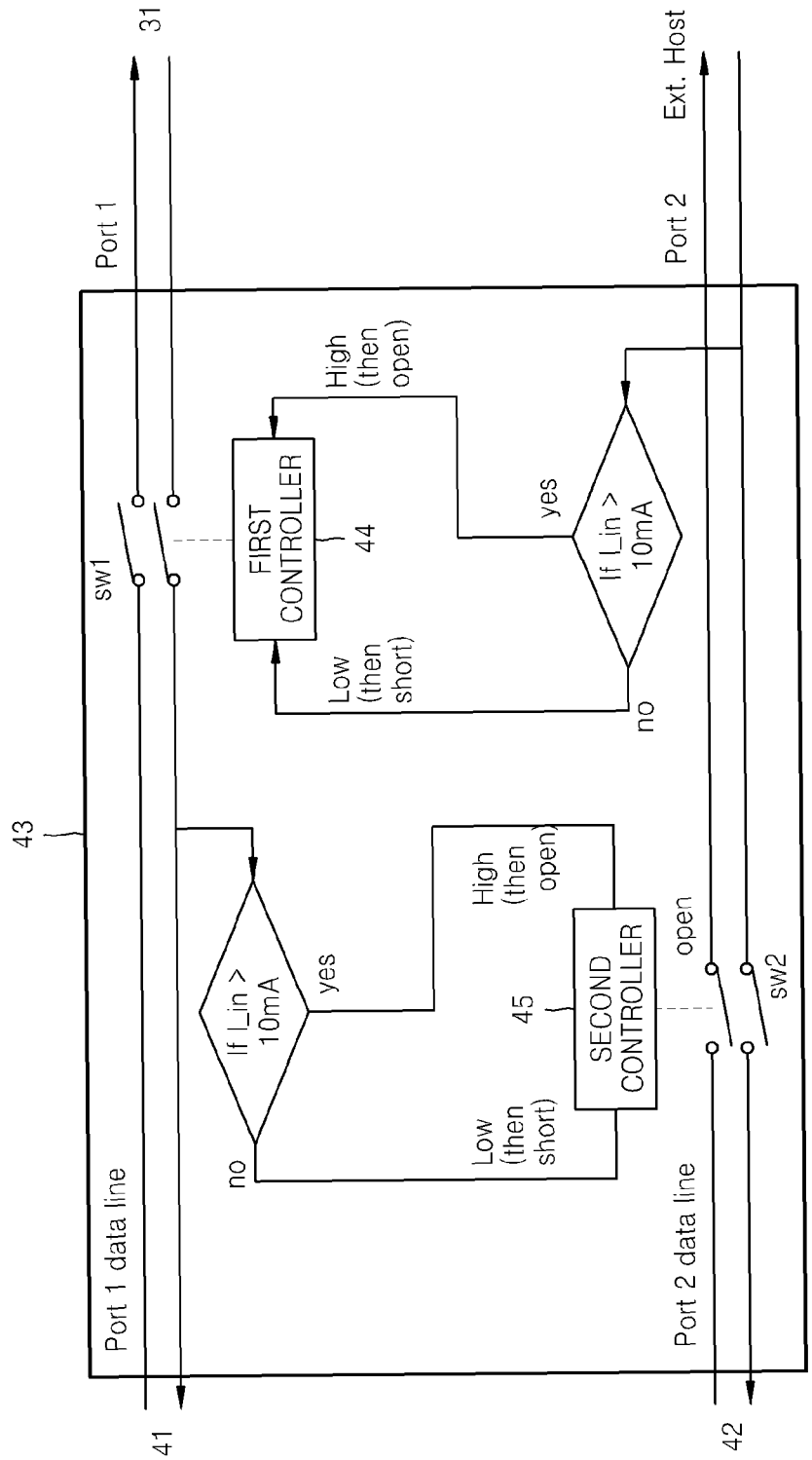
FIG. 4 is a diagram illustrating an example of a selective connection of a first port and a second port of the optical disc drive of FIG. 1.

FIG. 4 illustrates an example of a logic circuit diagram of the controller 43.

Referring to FIG. 4, a first switch SW1 is disposed between the first port 41 and the back-end portion 31, and a second switch SW2 is disposed between the second port 42 and the external host device. The first switch SW1 and the second switch SW2 each block a data line Port 1 and data line Port 2 of the first port 41 and the second port 42, respectively, and are controlled by first and second gate controllers 44 and 45, respectively.

The first gate controller 44 may detect a current I_in of the data line Port 1 corresponding to the second port 42. If a value of the detected current I_in is equal to or greater than a predetermined value, for example, 10 mA or higher, the first switch SW1 may be cut off so as to block data from the back-end part 31 connected to the first port 41. As another example, the second gate controller 45 may detect a current of the data line Port 1 corresponding to the first port 41. If a value of the current of the data line Port 2 corresponding to the first port 41 is equal to or greater than a predetermined value, the second switch SW2 may be cut off so as to block data from the external host device corresponding to the second port 42. As a general interfacing method, a current of 10 mA to 600 mA may flow through a USB data line. According to various aspects, simultaneous connection to the first and second ports 41 and 42 is prevented by using the general interfacing method.

Operations of the first and second gate controllers 44 and 45 are performed to prevent malfunction of the front-end portion 21 which may occur when data is simultaneously input to the first and second ports 41 and 42. As described above, the interface 4, including the first port 41 connected to the back-end portion 31 and the second port 42 to which an external host device (not shown) is connected, may select one of USB and SATA standards.

The optical disc drive according to various aspects may be used for various purposes. For example, the optical disc drive may be compatible with various external devices.

Figure 5:
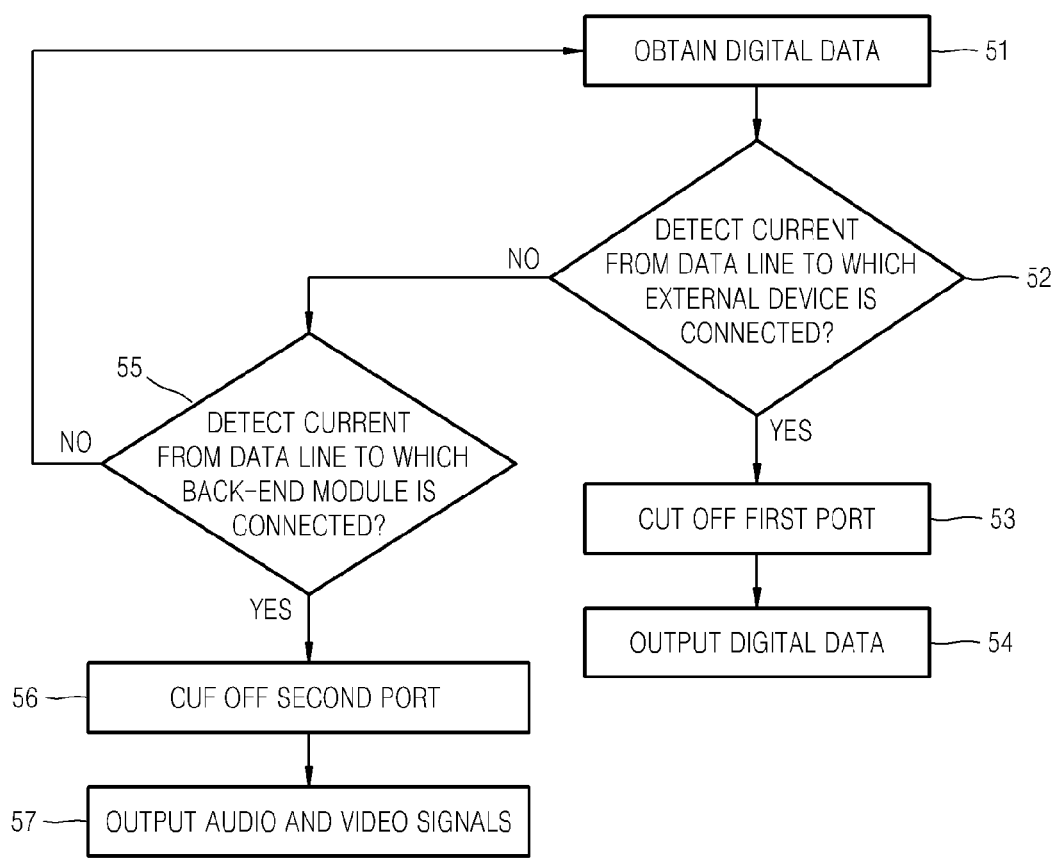
FIG. 5 is a diagram illustrating an example of a method of driving an optical disc drive.

FIG. 5 illustrates an example of a method of driving the optical disc drive.

Referring to FIG. 5, in 51, digital data is obtained from an optical disc 24. Current is detected from a data line 42 to which an external device is connected, in 52. If the current detected in 52 is equal to or greater than a predetermined value, the data line 41 is blocked in 53, and the digital data is transmitted to the external device or is received from the external device via the second port 42 in 54.

Otherwise, if the detected current in 52 is not equal to or greater than a predetermined value, a current in the data line 41 to which the back-end module 3 is connected is detected in 55. If the detected current in 55 is equal to or greater than a predetermined value, the second port 42 is cut off in 56. In 57, audio and video signals are generated by the back-end module 3, they are decoded into digital data via the first port 41, they are output to or received from the input/output unit 32, and they are encoded and transmitted to the front-end portion 21.

According to various aspects, the digital data obtained from the front-end portion 21, or the audio and video signals obtained from the back-end module 3 are selectively output by the interface 4, or signals input via the external device and the input/output unit 32 are selectively transmitted to the front-end portion 21.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical disc drive comprising:
   an optical drive module for writing and/or reproducing information to and/or from an optical disc and comprising a front-end portion that processes data from the optical disc;
   a back-end module comprising an audio part and a video part that decodes and outputs audio signals and video signals from signals generated by the optical drive module or encodes input audio signals and video signals; and
   an interface comprising a first port that connects the optical drive module and the back-end module, a second port that connects the optical drive module to an external device, and a controller that selectively controls connection to one of the first port and the second port through first and second switches corresponding to the first and second ports.

2. The optical disc drive of claim 1, wherein the interface device supports universal serial bus (USB) or serial advanced technology attachment (SATA).

3. The optical disc drive of claim 1, wherein the controller comprises:
   the first and second switches corresponding to the first and second ports; and
   first and second gate controllers for operating the first and second switches, respectively, by detecting a current of a data line connected to each of the first and second ports.

4. The optical disc drive of claim 3, wherein, in response to a current that is equal to or greater than a predetermined value being detected from a data line to which the external device is connected, the controller cuts off the first port to which the back-end module is connected using the first switch and allows digital data to be transmitted between the optical disc drive module and the external device via the second port, and
   in response to the current that is equal to or greater than the predetermined value not being detected from the data line to which the external device is connected, and in response to a current that is equal to or greater than the predetermined value being detected from a data line to which the back-end module is connected, the controller cuts off the second port using the second switch and allows the audio signals and the video signals to be transmitted between the back-end module and the optical disc drive module via the first port.

5. The optical disc drive of claim 1, wherein the back-end module further comprises at least one of HDMI, DVI, and D-SUB output units.

6. The optical disc drive of claim 1, wherein the back-end module further comprises an analog audio output unit.

7. The optical disc drive of claim 1, wherein the back-end module further comprises a wireless communication unit.

8. A method of driving an optical disc drive comprising an optical drive module for writing and/or reproducing information to and/or from an optical disc and for processing data from the optical disc, a back-end module that decodes and outputs audio signals and video signals from signals generated by the optical drive module or encodes input audio signals and video signals, and an interface that connects the optical drive module and the back-end module, that connects the optical drive module to an external device, and that selectively controls connection to a first port or a second port, the method comprising:
   obtaining digital data from the optical disc or writing information to the optical disc using the optical drive module;
   obtaining audio signals and video signals by processing the digital data or obtaining digital data by processing input audio signals and video signals using a back-end module; and
   selectively outputting digital data from the optical disc drive module to one of the back-end module and the external device using first and second switches of the interface corresponding to the first and second ports.

9. The method of claim 8, wherein the interface supports universal serial bus (USB) or serial advanced technology attachment (SATA).

10. The method of claim 8, wherein, if a current is detected from the back-end module via the first port, the second port and the external device are electrically separated from each other, and
    if a current is detected from the external device via the second port, the first port and the back-end module are electrically separated from each other.

11. The method of claim 8, wherein the back-end module outputs digital video signals.

12. The method of claim 8, wherein the interface supports USB or SATA.

13. A multi-functional optical disc drive, comprising:
    an optical disc drive module configured to obtain digital data from a disc;
    a back-end configured to decode and output audio signals and video signals from signals generated by the optical disc drive module; and
    an interface configured to selectively connect the optical disc drive module with one of the back-end and an external device through a first switch and a second switch corresponding to the back-end and the external device, respectively, such that the optical disc drive module is not connected to both the back-end and the external device at the same time using the first and second switches.

14. The multi-functional optical disc drive of claim 13, wherein the interface comprises a first port to connect the optical disc drive module with the back-end, a second port to connect the optical disc drive module with the external device, and a controller to control the first port and the second port using the first and second switches.

15. The multi-functional optical disc drive of claim 13, wherein the optical disc drive module comprises an optical pickup for writing/reproducing data from a disc, a motor for loading the disc onto the optical pickup, and a front-end that generates digital data that may be used for reproducing/writing audio/video (AV) signals.

16. The multi-functional optical disc drive of claim 13, wherein the back-end comprises an input/output unit which outputs/receives signals with various formats.

17. The multi-functional optical disc drive of claim 16, wherein the various formats comprise at least one of a high-definition multimedia interface that may output the digital signals generated by the back-end, a digital video interface (DVI), an analog D-SUB(VGA) interface, and an analog-audio input/output unit.

18. The multi-functional optical disc drive of claim 13, wherein the back-end comprises an input/output unit which outputs signals with various formats, and the input/output unit comprises at least two of a high-definition multimedia interface, a digital video interface (DVI), and an analog D-SUB(VGA) interface.

* * * * *